US012167258B2

United States Patent
Nakata et al.

(10) Patent No.: US 12,167,258 B2
(45) Date of Patent: Dec. 10, 2024

(54) COMMUNICATION APPARATUS, METHOD, PROGRAM AND RECORDING MEDIUM

(71) Applicant: NEC Corporation, Tokyo (JP)

(72) Inventors: Atsushi Nakata, Tokyo (JP); Daisuke Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 688 days.

(21) Appl. No.: 17/269,407

(22) PCT Filed: Aug. 1, 2019

(86) PCT No.: PCT/JP2019/030284
§ 371 (c)(1),
(2) Date: Feb. 18, 2021

(87) PCT Pub. No.: WO2020/044934
PCT Pub. Date: Mar. 5, 2020

(65) Prior Publication Data
US 2021/0329477 A1 Oct. 21, 2021

(30) Foreign Application Priority Data
Aug. 29, 2018 (JP) ................................. 2018-159929

(51) Int. Cl.
*H04W 4/00* (2018.01)
*H04W 24/04* (2009.01)
(Continued)

(52) U.S. Cl.
CPC ........... *H04W 24/04* (2013.01); *H04W 76/15* (2018.02); *H04W 72/232* (2023.01); *H04W 92/16* (2013.01)

(58) Field of Classification Search
None
See application file for complete search history.

(56) References Cited

U.S. PATENT DOCUMENTS

| 10,631,358 B1* | 4/2020 | Fang ..................... H04W 76/27 |
| 2004/0095952 A1* | 5/2004 | Zhang ..................... H04L 12/40 |
| | | 370/438 |

(Continued)

FOREIGN PATENT DOCUMENTS

| JP | 2012-058899 A | 3/2012 |
| JP | 2012-080205 A | 4/2012 |

(Continued)

OTHER PUBLICATIONS

International Search Report for PCT Application No. PCT/JP2019/030284, mailed on Sep. 10, 2019.

(Continued)

*Primary Examiner* — Bob A Phunkulh
(74) *Attorney, Agent, or Firm* — Sughrue Mion, PLLC

(57) ABSTRACT

In an architecture in which the inside of a radio access network is split into two layers and the processes are performed in separate apparatuses, respectively, to achieve the redundancy of the processes of the higher layer. A server apparatus 100 is a communication apparatus that comprises a first layer processing unit 141 configured to perform a process of a first layer in a radio access network, an establishing unit 143 configured to perform a process for establishing connections with two or more clients performing a process of a second layer, which is higher than the first layer, an obtaining unit 145 configured to obtain information related to a connection state with a first client performing the process of the second layer, and a communication processing unit 147 configured to transmit, to a second client, the information related to the connection state with the first client.

8 Claims, 13 Drawing Sheets

(51) Int. Cl.
*H04W 76/15* (2018.01)
*H04W 72/232* (2023.01)
*H04W 92/16* (2009.01)

(56) References Cited

U.S. PATENT DOCUMENTS

| | | | | |
|---|---|---|---|---|
| 2007/0136594 | A1* | 6/2007 | Jordan | G05B 19/054 713/172 |
| 2007/0173270 | A1* | 7/2007 | Block | H04W 74/06 455/507 |
| 2007/0177552 | A1* | 8/2007 | Wu | H04W 88/08 370/335 |
| 2008/0276132 | A1* | 11/2008 | Majewski | G06F 11/0757 714/55 |
| 2010/0057849 | A1* | 3/2010 | Ji | H04L 41/0681 709/222 |
| 2012/0058724 | A1 | 3/2012 | Yamada et al. | |
| 2012/0136986 | A1* | 5/2012 | Nader | G06F 11/3414 709/224 |
| 2012/0158827 | A1* | 6/2012 | Mathews | G06F 11/00 709/224 |
| 2012/0163299 | A1* | 6/2012 | Chen | H04W 56/004 370/328 |
| 2012/0275363 | A1* | 11/2012 | Hu | H04W 52/0206 370/311 |
| 2013/0308626 | A1* | 11/2013 | Feng | H04B 10/25 370/350 |
| 2018/0139091 | A1* | 5/2018 | Maeder | H04L 41/0806 |
| 2018/0241689 | A1* | 8/2018 | Xu | H04L 61/5014 |
| 2019/0174391 | A1 | 6/2019 | Ode et al. | |
| 2019/0245732 | A1* | 8/2019 | Luo | H04L 41/0859 |
| 2019/0320486 | A1* | 10/2019 | Khan | H04B 7/0413 |
| 2019/0320487 | A1* | 10/2019 | Khan | H04W 76/27 |
| 2019/0373666 | A1* | 12/2019 | Khan | H04W 76/27 |
| 2020/0235788 | A1* | 7/2020 | Rajagopal | H04B 7/0848 |
| 2020/0413288 | A1* | 12/2020 | Shi | H04L 47/32 |

FOREIGN PATENT DOCUMENTS

| | | |
|---|---|---|
| WO | 2016/031101 A1 | 3/2016 |
| WO | 2018/029854 A1 | 2/2018 |

OTHER PUBLICATIONS

XRAN Fronthaul Working Group White Paper, XRAN-FH.WP.0-vOI.00 White Paper [online], [retrieved on Aug. 22, 2019], Retrieved from the Internet: < URL: https://staticl.squarespace.com/static/57e95f5abe65943a7a209f26/t/5acf626f03ce64bga47d3eea/1523540591966/2018.04.11-XRAN-FH.WP.0-vOI.00.pdf>, Jul. 19, 2018, pp. 1-11.

ITU-T Study Group 15, "LS/r Initiation of work to support IMT-2020/SG in the Transport Network (reply to 3GPP-RAN-LS8)", 3GPP TSG RAN Meeting #79 RP-180037 [online], Mar. 7, 2018, sections 5.1-5. 3,5.3.2, Chennai, India.

JP Official Communication for JP Application No. 2023-101592, mailed on May 7, 2024 with English Translation.

* cited by examiner

COMMUNICATION APPARATUS, METHOD, PROGRAM AND RECORDING MEDIUM

This application is a National Stage Entry of PCT/JP2019/030284 filed on Aug. 1, 2019, which claims priority from Japanese Patent Application 2018-159929 filed on Aug. 29, 2018, the contents of all of which are incorporated herein by reference, in their entirety.

BACKGROUND

Technical Field

The present invention relates to a communication apparatus, its method, program and recording medium.

Background Art

As described in non-patent literature 1, architectures for next-generation radio access networks have been under study. To be more specific, FIG. 1 of non-patent literature 1 describes splitting the physical layer, where processes are performed on the base station side in a radio access network, into a high physical layer and a low physical layer, performing the processes of the high physical layer in a central unit, and performing the processes of the low physical layer in a radio unit.

CITATION LIST

Non-Patent Literature

[NPL 1] xRAN-MP-WG, XRAN-FH.WP.0-v01.00, [online], Jul. 19, 2018, xRAN-MP-WG, [Searched on Aug. 27, 2018], Internet (URL: http://www.xran.org/resources/)

SUMMARY

Technical Problem

Unfortunately, although an architecture to split the processes to be performed on the base station side in a radio access network into a higher layer and a lower layer, and perform the processes in separate units (apparatuses), respectively, is disclosed in above-noted non-patent literature 1 and elsewhere, not much specific thought has been given as to how to achieve its redundancy.

It is therefore an example object of the present invention to provide a communication apparatus, its method, program, and recording medium that, in an architecture in which the processes to be performed in a radio access network are split into two layers and performed in separate apparatuses, respectively, makes it possible to achieve the redundancy of the processes of the higher layer.

Solution to Problem

According to one example aspect of the present invention, a communication apparatus comprises a first layer processing unit configured to perform a process of a first layer in a radio access network, an establishing unit configured to perform a process for establishing connections with two or more clients performing a process of a second layer, which is higher than the first layer, in the radio access network, an obtaining unit configured to obtain information related to a connection state with a first client performing the process of the second layer, and a communication processing unit configured to transmit, to a second client, the information related to the connection state with the first client.

According to one example aspect of the present invention, a communication apparatus comprises a communication processing unit configured to communicate with a server performing a process of a first layer in a radio access network, the server being connectable with two or more client apparatuses performing a process of a second layer, which is higher than the first layer, in the radio access network, and receive information related to a connection state between the server and a first client performing the process of the second layer, and a control unit configured to perform control related to a connection between the server and a second client performing the process of the second layer, depending on the information related to the connection state with the first client.

According to one example aspect of the present invention, a method comprises performing a process of a first layer in a radio access network, performing a process for establishing connections with two or more clients performing a process of a second layer, which is higher than the first layer, in the radio access network, obtaining information related to a connection state with a first client performing the process of the second layer, and transmitting, to a second client, the information related to the connection state with the first client.

According to one example aspect of the present invention, a method comprises communicating with a server performing a process of a first layer in a radio access network, the server being connectable with two or more client apparatuses performing a process of a second layer, which is higher than the first layer, in the radio access network, and receiving information related to a connection state between the server and a first client performing the process of the second layer, and performing control related to a connection between the server and a second client performing the process of the second layer, depending on the information related to the connection state with the first client.

According to one example aspect of the present invention, a program causes a processor to execute performing a process of a first layer in a radio access network, performing a process for establishing connections with two or more clients performing a process of a second layer, which is higher than the first layer, in the radio access network, obtaining information related to a connection state with a first client performing the process of the second layer, and transmitting, to a second client, the information related to the connection state with the first client.

According to one example aspect of the present invention, a program causes a processor to execute communicating with a server performing a process of a first layer in a radio access network, the server being connectable with two or more client apparatuses performing a process of a second layer, which is higher than the first layer, in the radio access network, and receiving information related to a connection state between the server and a first client performing the process of the second layer, and performing control related to a connection between the server and a second client performing the process of the second layer, depending on the information related to the connection state with the first client.

According to one example aspect of the present invention, a recording medium is a non-transitory computer-readable recording medium storing a program that causes a processor to execute performing a process of a first layer in a radio access network, performing a process for establishing connections with two or more clients performing a process of a second layer, which is higher than the first layer, in the radio access network, obtaining information related to a connection state with a first client performing the process of the second layer, and transmitting, to a second client, the information related to the connection state with the first client.

According to one example aspect of the present invention, a recording medium is a non-transitory computer-readable recording medium storing a program that causes a processor to execute performing communication with a server performing a process of a first layer in a radio access network, the server being connectable with two or more client apparatuses performing a process of a second layer, which is higher than the first layer, in the radio access network, and receiving information related to a connection state between the server and a first client performing the process of the second layer, and performing control related to a connection between the server and a second client performing the process of the second layer, depending on the information related to the connection state with the first client.

Advantageous Effects of Invention

According to the present invention, in an architecture in which the processes to be performed in a radio access network are split into two layers and performed in separate apparatuses, respectively, it is possible to achieve the redundancy of the processes of the second layer, which is higher than the first layer. Note that, according to the present invention, instead of or together with the above advantageous effect, other advantageous effects may be brought about.

DESCRIPTION OF THE EXAMPLE EMBODIMENTS

Hereinafter, example embodiments of the present invention will be described in detail with reference to the accompanying drawings. Note that, in the Specification and drawings, elements that can be described in the same or similar terms will be assigned the same reference signs, and overlapping description may be omitted.

The description will be given in the following order:
1. Summary of Example Embodiments of the Present Invention
2. Configuration of System
3. First Example Embodiment
   3.1. Configuration of Server Apparatus 100
   3.2. Configuration of Client Apparatus 200
   3.3. Configuration of Client Apparatus 300
   3.4. Configuration of Client Apparatus 400
   3.5. Technical Features
   3.6. Example Alternation
4. Second Example Embodiment
   4.1. Configuration of Communication Apparatus
   4.2. Technical Features
5. Third Example Embodiment
   5.1. Configuration of Communication Apparatus
   5.2. Technical Features
6. Other Example Embodiments 1. Summary of Example Embodiments of the Present Invention First, a summary of example embodiments of the present invention will be described.

(1) Technical Issue

As described in the following reference literature, architectures for next-generation radio access networks have been under study. [Reference Literature] xRAN-MP-WG, XRAN-FH.WP.0-v01.00, [online], Jul. 19, 2018, xRAN-MP-WG, [Searched on Aug. 27, 2018], Internet (URL: http://www.xran.org/resources/)

Figure 1:
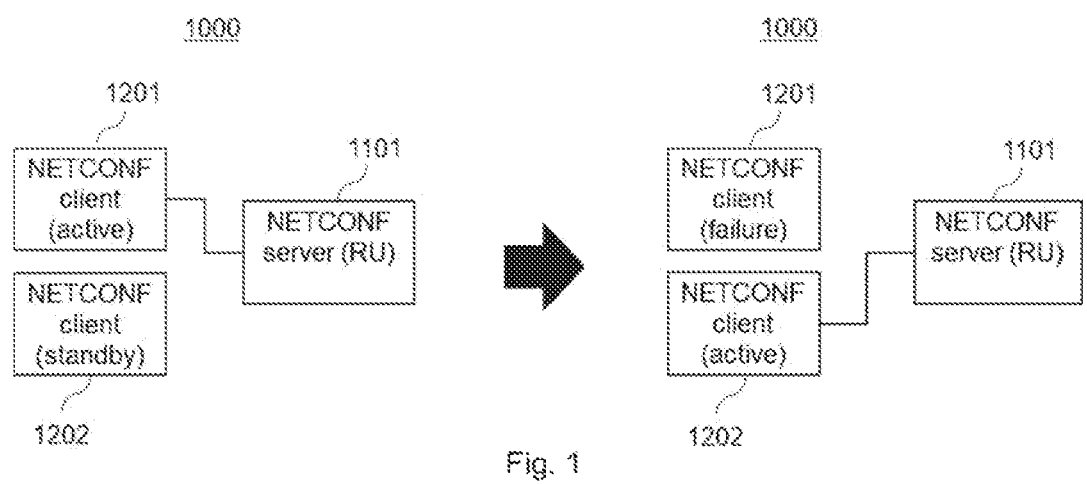
FIG. 1 is a diagram to show a specific example in which, in an architecture 1000 where the processes to be performed on the base station side in a radio access network are split into two layers and performed in separate apparatuses, respectively, the processes of the higher layer are made redundant.

To be more specific, FIG. 1 of the above-noted reference literature describes splitting the physical layer, where processes are performed on the base station side in a radio access network, into a high physical layer and a low physical layer, performing the processes of the high physical layer in a central unit, and performing the processes of the low physical layer in a radio unit.

Unfortunately, although an architecture to split the processes to be performed on the base station side in a radio access network into a higher layer and a lower layer, and perform the processes in separate units (apparatuses), respectively, is disclosed in the above-noted reference literature and elsewhere, not much specific thought has been given as to how to achieve its redundancy.

It is therefore an example object of the herein-contained example embodiments to achieve, in an architecture in which the processes to be performed in a radio access network are split into two layers and performed in separate apparatuses, respectively, the redundancy of the processes of the higher layer, as shown in FIG. 1, for example.

FIG. 1 is a diagram to show a specific example in which, in an architecture 1000 where the processes to be performed on the base station side in a radio access network are split into two layers and performed in separate apparatuses, respectively, the processes of the higher layer are made redundant.

That is, the architecture 1000 shown in FIG. 1 is comprised of a server apparatus 1101 that performs the processes of the lower layer, and two client apparatuses 1201 and 1202 that perform the processes of the higher layer.

For example, the server apparatus 1101 is a network configuration protocol (NETCONF) server, and, to be more specific, a radio unit that performs the processes of the low physical layer. In addition, the client apparatuses 1201 and 1202 are each a network configuration protocol (NETCONF) client, and, to be more specific, a central unit that performs the processes of the high physical layer or layers higher than that.

When the communication between the client apparatus 1201 and the server apparatus 1101 is disconnected in the architecture 1000 configured as described above, the server apparatus 1101 needs to switch from the client apparatus 1201 to the client apparatus 1202 to perform the processes.

(2) Technical Feature

According to the herein-contained example embodiments, for example, the processes of the first layer are performed in the radio access network, the process for establishing connections with two or more clients performing the processes of the second layer, which is higher than the first layer, is performed in the radio access network, information related to the connection state with the first client performing the processes of the second layer is obtained, and the information related to the connection state with the first client is transmitted to the second client.

By this means, for example, in an architecture in which the inside of a radio access network is split into two layers and the processes are performed in separate apparatuses, respectively, the redundancy of the processes of the second layer, which is higher than the first layer, can be achieved.

Note that the above-described technical feature is a specific example of example embodiments of the present invention, and, obviously, example embodiments of the present invention are not limited to this technical feature.

2. Configuration of System

Figure 2:
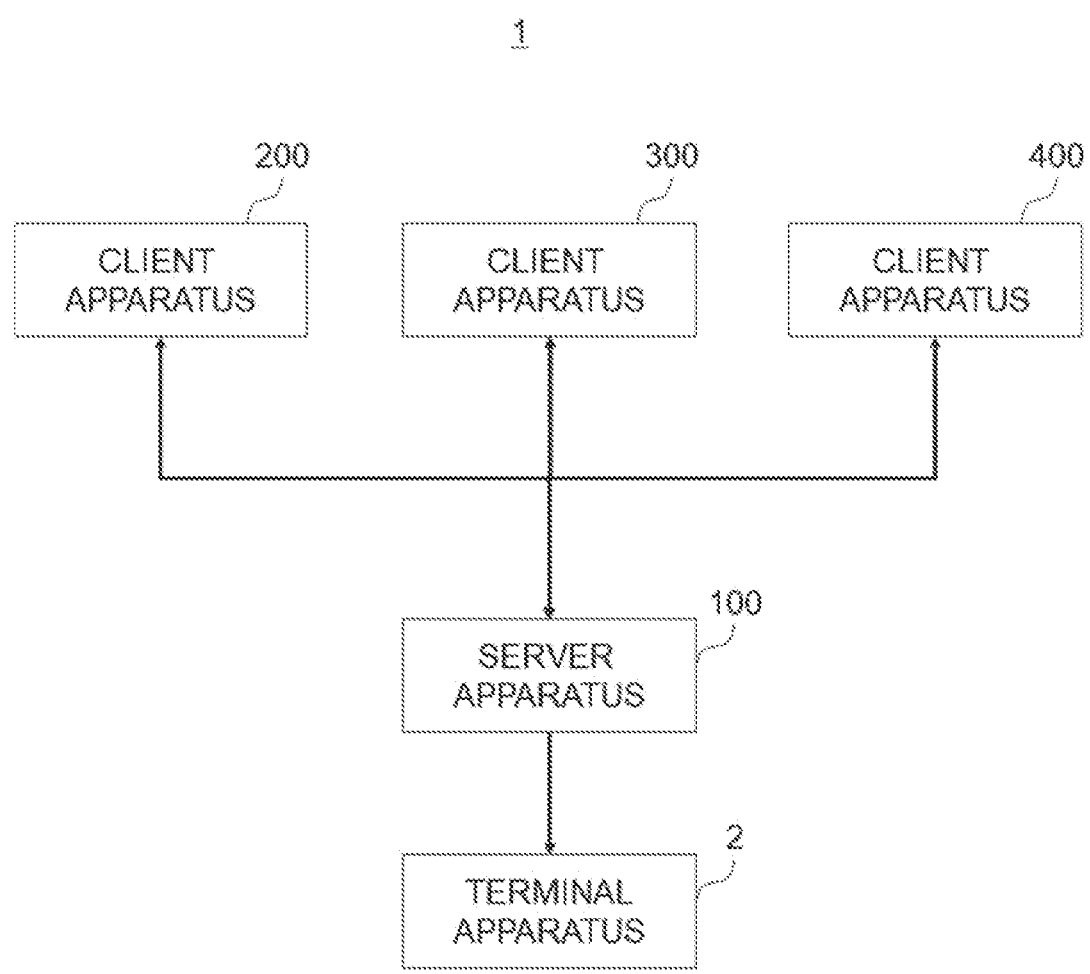
FIG. 2 is an explanatory diagram to show an example of a schematic configuration of a system 1 according to an example embodiment, to which the present invention is applied.

Now, with reference to FIG. 2, an example of the configuration of a system 1 according to an example embodiment of the present invention will be described below. FIG. 2 is an explanatory diagram to show an example of a schematic configuration of the system 1 according to an example embodiment, to which the present invention is applied. Referring to FIG. 2, the system 1 has a server apparatus 100 and client apparatuses 200, 300 and 400 that perform radio communication with a terminal apparatus 2.

For example, the server apparatus 100 is a network configuration protocol (NETCONF) server, and, to be more specific, a radio unit that performs the processes of the low physical layer.

Also, the client apparatuses 200, 300 and 400 are clients of the server apparatus 100. For example, the client apparatuses 200, 300 and 400 are network configuration protocol (NETCONF) clients, and, to be more specific, the client apparatuses 200, 300 and 400 are central units that perform the processes of the high physical layer or layers higher than that, or network management systems that manage the radio access network.

3. First Example Embodiment

Next, a first example embodiment of the present invention will be described below with reference to FIG. 3 to FIG. 11.

3.1. Configuration of Server Apparatus 100

Figure 3:
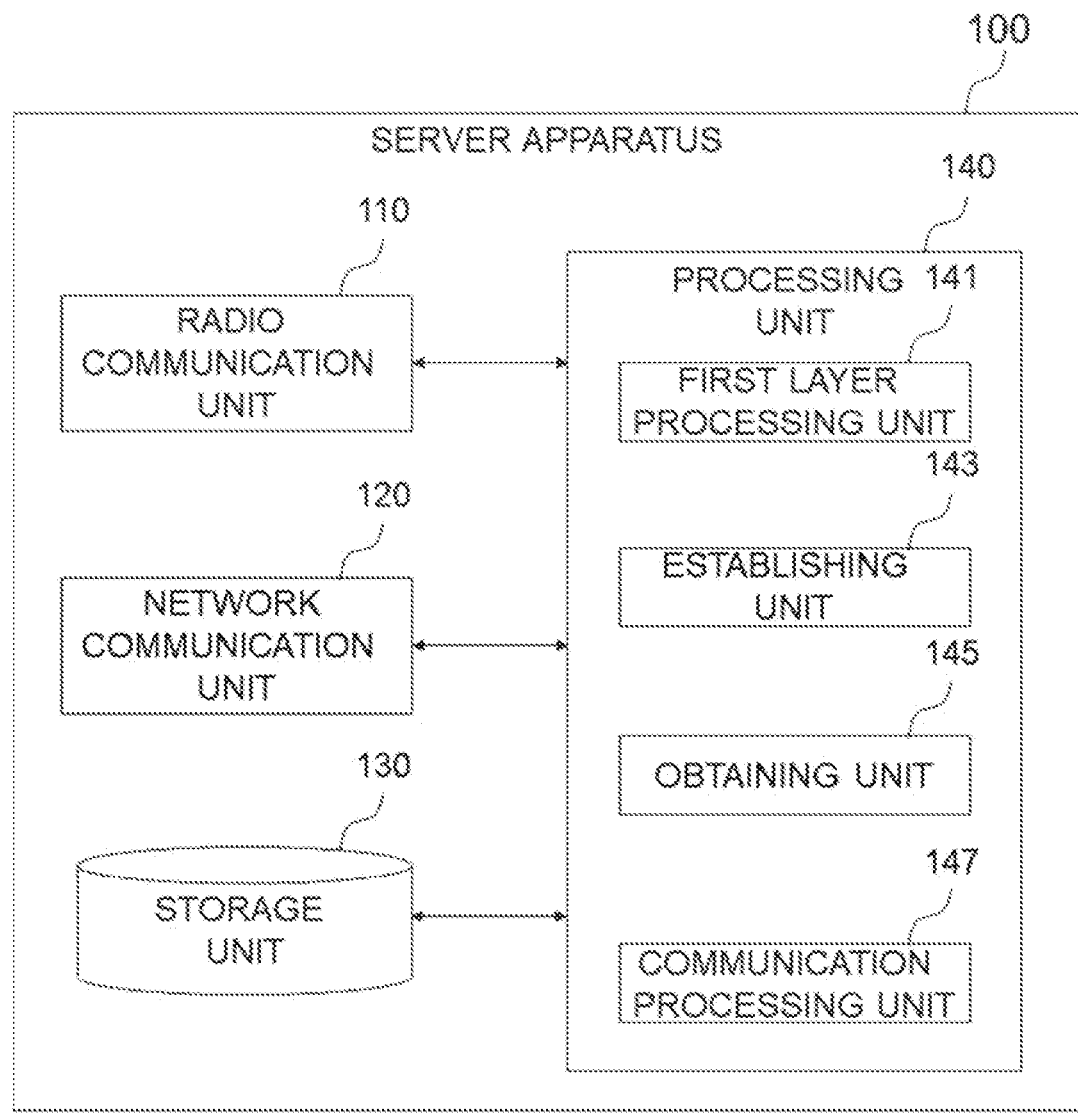
FIG. 3 is a block diagram to show an example of a schematic configuration of a server apparatus 100 according to a first example embodiment.

Next, an example of the configuration of a server apparatus 100 according to the first example embodiment will be described below with reference to FIG. 3. FIG. 3 is a block diagram to show an example of a schematic configuration of the server apparatus 100 according to the first example embodiment. Referring to FIG. 3, the server apparatus 100 has a radio communication unit 110, a network communication unit 120, a storage unit 130 and a processing unit 140.

(1) Radio Communication Unit 110

The radio communication unit 110 transmits and receives signals by radio. For example, the radio communication unit 110 receives signals from a terminal apparatus (for example, a terminal apparatus 2) and transmits signals to the terminal apparatus (for example, the terminal apparatus 2).

(2) Network Communication Unit 120

The network communication unit 120 receives signals from the network, and transmits signals to the network.

(3) Storage Unit 130

The storage unit 130 temporarily or permanently stores s program (commands) and parameters for the operation of the server apparatus 100, and a variety of data. This program includes one or more commands for the operation of the server apparatus 100.

(4) Processing Unit 140

The processing unit 140 provides a variety of functions of the server apparatus 100. The processing unit 140 includes a first layer processing unit 141, an establishing unit 143, an obtaining unit 145, and a communication processing unit 147. Note that the processing unit 140 may further include other components than these components. That is, the processing unit 140 may perform operations other than those of these components. The specific operations of the first layer processing unit 141, the establishing unit 143, the obtaining unit 145, and the communication processing unit 147 will be described in detail later.

For example, the processing unit 140 (communication processing unit 147) communicates with a terminal apparatus (for example, the terminal apparatus 2) via the radio communication unit 110. For example, the processing unit 140 (communication processing unit 147) communicates with other network nodes (for example, the client apparatuses 200, 300 and 400) via the network communication unit 120.

(5) Implementation Example

The radio communication unit 110 may be implemented by an antenna, a high frequency (radio frequency (RF))

circuit, and so forth, and this antenna may be a directional antenna. The network communication unit 120 may be implemented by a network adapter, a network interface card, and/or the like. The storage unit 130 may be implemented by a memory (for example, a non-volatile memory and/or a volatile memory), a hard disk, and/or the like. The processing unit 140 may be implemented by one or more processors, such as baseband (BB) processors and/or other types of processors. The first layer processing unit 141, the establishing unit 143, the obtaining unit 145, and the communication processing unit 147 may be implemented by the same processor, or may be implemented separately by different processors. The memory (storage unit 130) may be included in the one or more processors, or may be provided outside the one or more processors.

The server apparatus 100 may include a memory that stores a program (commands), and one or more processors that can execute this program (commands). These one or more processors may execute the program, and perform the operations of the processing unit 140 (the operations of the first layer processing unit 141, the establishing unit 143, the obtaining unit 145, and/or the communication processing unit 147). The program may be a program that causes the processors to execute the operations of the processing unit 140 (the operations of the first layer processing unit 141, the establishing unit 143, the obtaining unit 145, and/or the communication processing unit 147).

3.2. Configuration of Client Apparatus 200

Figure 4:
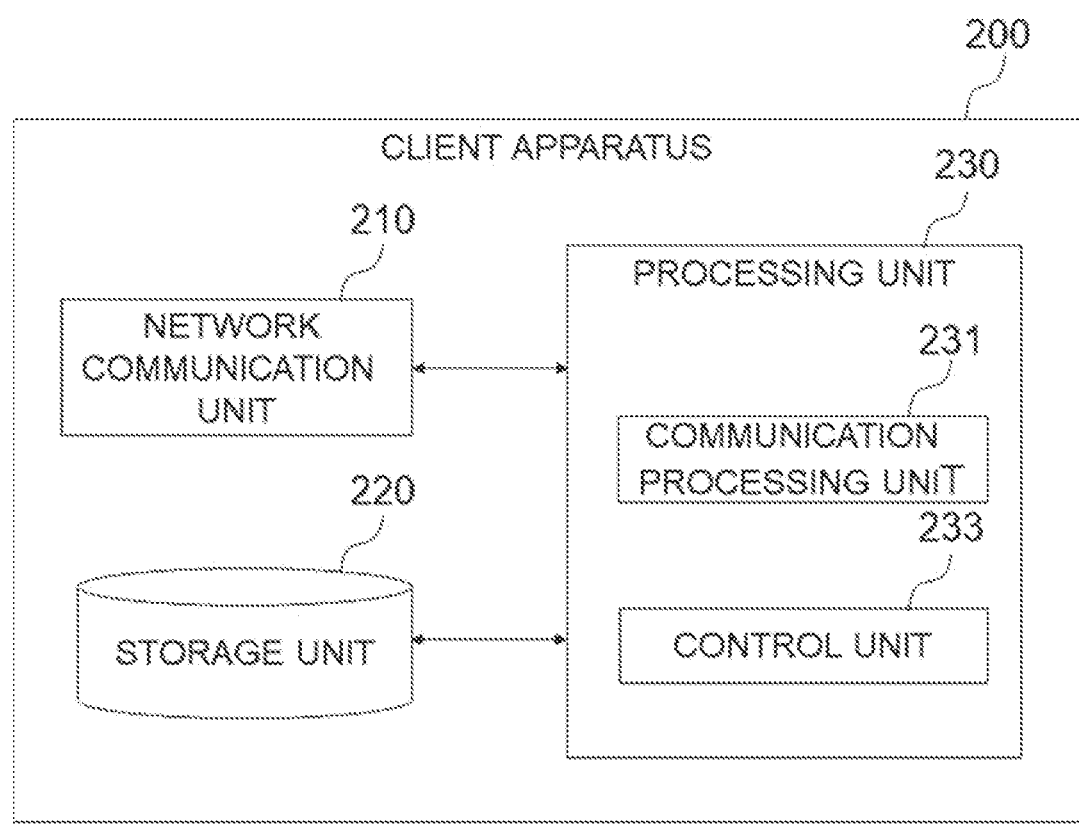
FIG. 4 is a block diagram to show an example of a schematic configuration of a client apparatus 200 according to the first example embodiment.

Next, an example of the configuration of the client apparatus 200 according to the first example embodiment will be described below with reference to FIG. 4. FIG. 4 is a block diagram to show an example of a schematic configuration of the client apparatus 200 according to the first example embodiment. Referring to FIG. 4, the client apparatus 200 includes a network communication unit 210, a storage unit 220 and a processing unit 230.

(1) Network Communication Unit 210

The network communication unit 210 receives signals from the network, and transmits signals to the network.

(2) Storage Unit 220

The storage unit 220 temporarily or permanently stores a program (commands) and parameters for the operation of the client apparatus 200, and a variety of data. This program includes one or more commands for the operation of the client apparatus 200.

(3) Processing Unit 230

The processing unit 230 provides a variety of functions of the client apparatus 200. The processing unit 230 includes a communication processing unit 231 and a control unit 233. Note that the processing unit 230 may further include other components than these components. That is, the processing unit 230 may perform operations other than those of these components.

For example, the processing unit 230 (communication processing unit 231) communicates with other network nodes (for example, the server apparatus 100 and the client apparatuses 300 and 400) via the network communication unit 210.

(4) Implementation Example

The network communication unit 210 may be implemented by a network adapter, a network interface card, and/or the like. The storage unit 220 may be implemented by a memory (for example, a non-volatile memory and/or a volatile memory), a hard disk, and/or the like. The processing unit 230 may be implemented by one or more processors. The communication processing unit 231 and the control unit 233 may be implemented by the same processor, or may be implemented separately by different processors. The memory (storage unit 220) may be included in the one or more processors, or may be provided outside the one or more processors.

The client apparatus 200 may include a memory that stores a program (commands) and one or more processors that can execute this program (commands). These one or more processors may execute the program, and perform the operations of the processing unit 230 (the operations of the communication processing unit 231 and/or the control unit 233). The program may be a program that causes the processors to execute the operations of the processing unit 230 (the operations of the communication processing unit 231 and/or the control unit 233).

Note that the client apparatus 200 may be virtualized. That is, the client apparatus 200 may be implemented as a virtual machine. In this case, the client apparatus 200 (virtual machine) may operate as a virtual machine on a physical machine (hardware) including the processors, memory and so forth, and on a hypervisor.

3.3. Configuration of Client Apparatus 300

Figure 5:
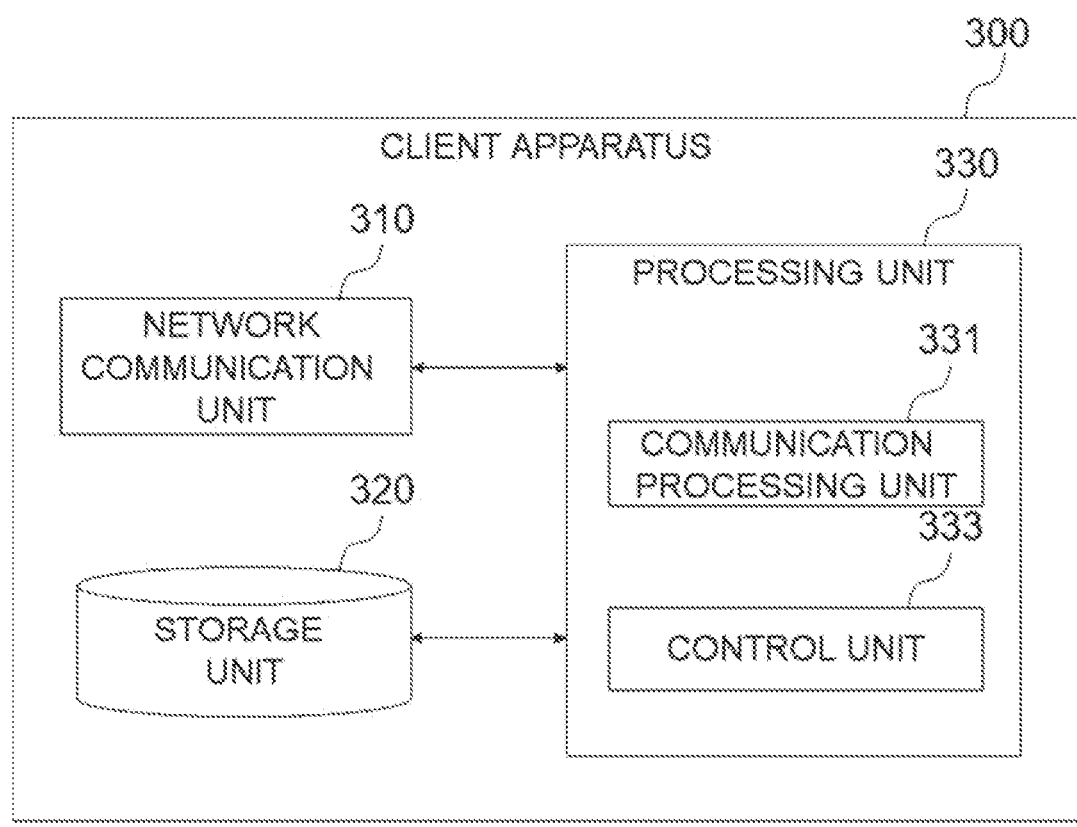
FIG. 5 is a block diagram to show an example of a schematic configuration of a client apparatus 300 according to the first example embodiment.

Next, an example of the configuration of the client apparatus 300 according to the first example embodiment will be described below with reference to FIG. 5. FIG. 5 is a block diagram to show an example of a schematic configuration of the client apparatus 300 according to the first example embodiment. Referring to FIG. 5, the client apparatus 300 includes a network communication unit 310, a storage unit 320 and a processing unit 330.

(1) Network Communication Unit 310

The network communication unit 310 receives signals from the network, and transmits signals to the network.

(2) Storage Unit 320

The storage unit 320 temporarily or permanently stores a program (commands) and parameters for the operation of the client apparatus 300, and a variety of data. This program includes one or more commands for the operation of the client apparatus 300.

(3) Processing Unit 330

The processing unit 330 provides a variety of functions of the client apparatus 300. The processing unit 330 includes a communication processing unit 331 and a control unit 333. Note that the processing unit 330 may further include other components than these components. That is, the processing unit 330 may perform operations other than those of these components.

For example, the processing unit 330 (the communication processing unit 331) communicates with other network nodes (for example, the server apparatuses 100 and the client apparatuses 200 and 400) via the network communication unit 310.

(4) Implementation Example

The network communication unit 310 may be implemented by a network adapter, a network interface card, and/or the like. The storage unit 320 may be implemented by a memory (for example, a non-volatile memory and/or a volatile memory), a hard disk, and/or the like. The processing unit 330 may be implemented by one or more processors. The communication processing unit 331 and the control unit 333 may be implemented by the same processor, or may be implemented separately by different processors. The memory (storage unit 320) may be included in the one or more processors, or may be provided outside the one or more processors.

The client apparatus 300 may include a memory that stores a program (commands) and one or more processors that can execute this program (commands). These one or more processors may execute the program, and perform the operations of the processing unit 330 (the operations of the communication processing unit 331 and/or the control unit 333). The program may be a program that causes the processors to execute the operations of the processing unit 330 (the operations of the communication processing unit 331 and/or the control unit 333).

Note that the client apparatus 300 may be virtualized. That is, the client apparatus 300 may be implemented as a virtual machine. In this case, the client apparatus 300 (virtual machine) may operate as a virtual machine on a physical machine (hardware) including the processors, memory and so forth, and on a hypervisor.

3.4. Configuration of Client Apparatus 400

Figure 6:
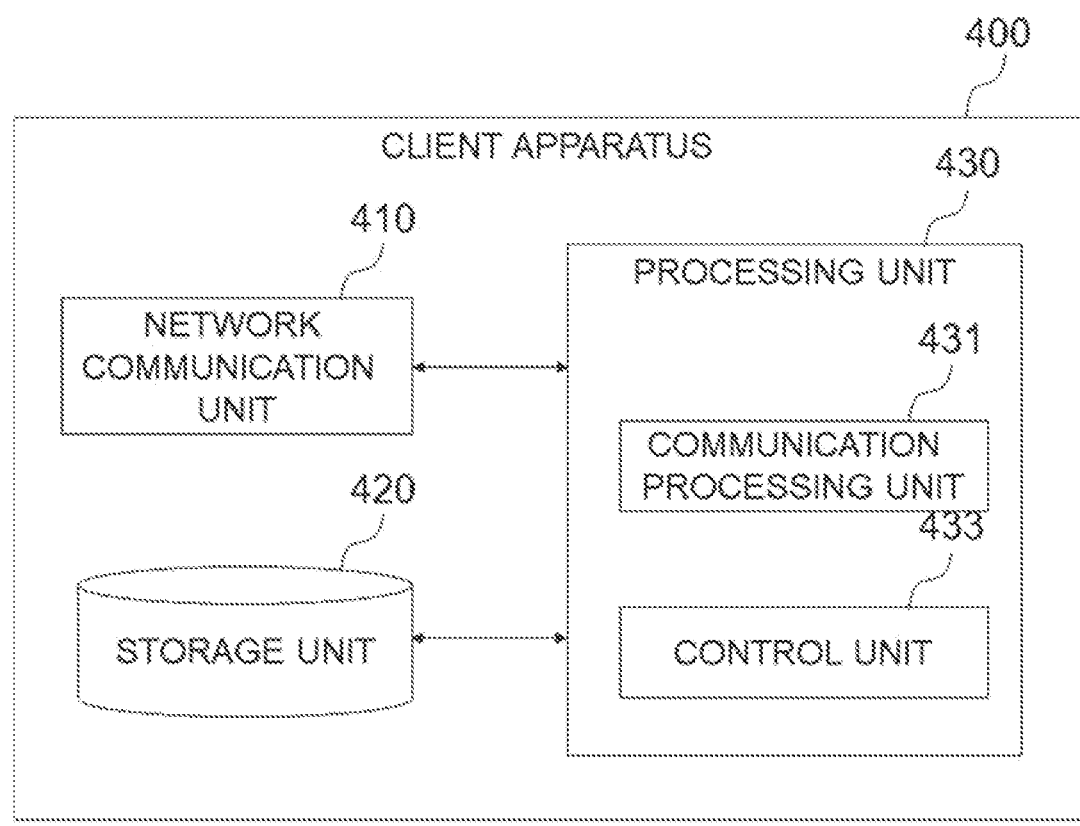
FIG. 6 is a block diagram to show an example of a schematic configuration of a client apparatus 400 according to the first example embodiment.

Next, an example of the configuration of the client apparatus 400 according to the first example embodiment will be described below with reference to FIG. 6. FIG. 6 is a block diagram to show an example of a schematic configuration of the client apparatus 400 according to the first example embodiment. Referring to FIG. 6, the client apparatus 400 includes a network communication unit 410, a storage unit 420 and a processing unit 430.

(1) Network Communication Unit 410

The network communication unit 410 receives signals from the network, and transmits signals to the network.

(2) Storage Unit 420

The storage unit 420 temporarily or permanently stores a program (commands) and parameters for the operation of the client apparatus 400, and a variety of data. This program includes one or more commands for the operation of the client apparatus 400.

(3) Processing Unit 430

The processing unit 430 provides a variety of functions of the client apparatus 400. The processing unit 430 includes a communication processing unit 431 and a control unit 433. Note that the processing unit 430 may further include components other than these components. That is, the processing unit 430 may perform operations other than those of these components.

For example, the processing unit 430 (communication processing unit 431) communicates with other network nodes (for example, the server apparatuses 100 and the client apparatuses 200 and 300) via the network communication unit 410.

(4) Implementation Example

The network communication unit 410 may be implemented by a network adapter, a network interface card, and/or the like. The storage unit 420 may be implemented by a memory (for example, a non-volatile memory and/or a volatile memory), a hard disk, and/or the like. The processing unit 430 may be implemented by one or more processors. The communication processing unit 431 and the control unit 433 may be implemented by the same processor, or may be implemented separately by different processors. The memory (storage unit 420) may be included in the one or more processors, or may be provided outside the one or more processors.

The client apparatus 400 may include a memory that stores a program (commands) and one or more processors that can execute this program (commands). These one or more processors may execute the program, and perform the operations of the processing unit 430 (the operations of the communication processing unit 431 and the control unit 433). The program may be a program that causes the processors to execute the operations of the processing unit 430 (the operations of the communication processing unit 431 and the control unit 433).

Note that the client apparatus 400 may be virtualized. That is, the client apparatus 400 may be implemented as a virtual machine. In this case, the client apparatus 400 (virtual machine) may operate as a virtual machine on a physical machine (hardware) including the processors, memory and so forth, and on a hypervisor.

3.5. Technical Features

Next, technical features of the first example embodiment will be described.

The server apparatus 100 (first layer processing unit 141) performs the processes of the first layer in the radio access network. The server apparatus 100 (establishing unit 143) performs the process for establishing connections with two or more clients (for example, client apparatuses 200 and 300) that perform the processes of the second layer, which is higher than the first layer, in the radio access network. The server apparatus 100 (obtaining unit 145) obtains information related to the connection state with the first client (for example, the client apparatus 200) that performs the processes of the second layer. The server apparatus 100 (communication processing unit 147) transmits the information related to the connection state with the first client, to a second client (for example, a client apparatus 300 or a client apparatus 400).

(1) First and Second Layers

For example, when the physical layer is split into a high physical layer and a low physical layer, the low physical layer is the first layer. To be more specific, the low physical layer covers processes such as the fast Fourier transform (FFT)/inverse fast Fourier transform (iFFT), digital beamforming, physical random access channel (PRACH) extraction and filtering, and so forth.

The second layer refers to higher layers including the high physical layer. To be more specific, the high physical layer covers processes such as forward error correction (FEC) encoding/decoding, scrambling, modulation/demodulation, and so forth.

As described earlier, FIG. 7 is a block diagram to show a specific architecture of a system 1 that is implemented when the physical layer is split into a high physical layer and a low physical layer.

Figure 7:
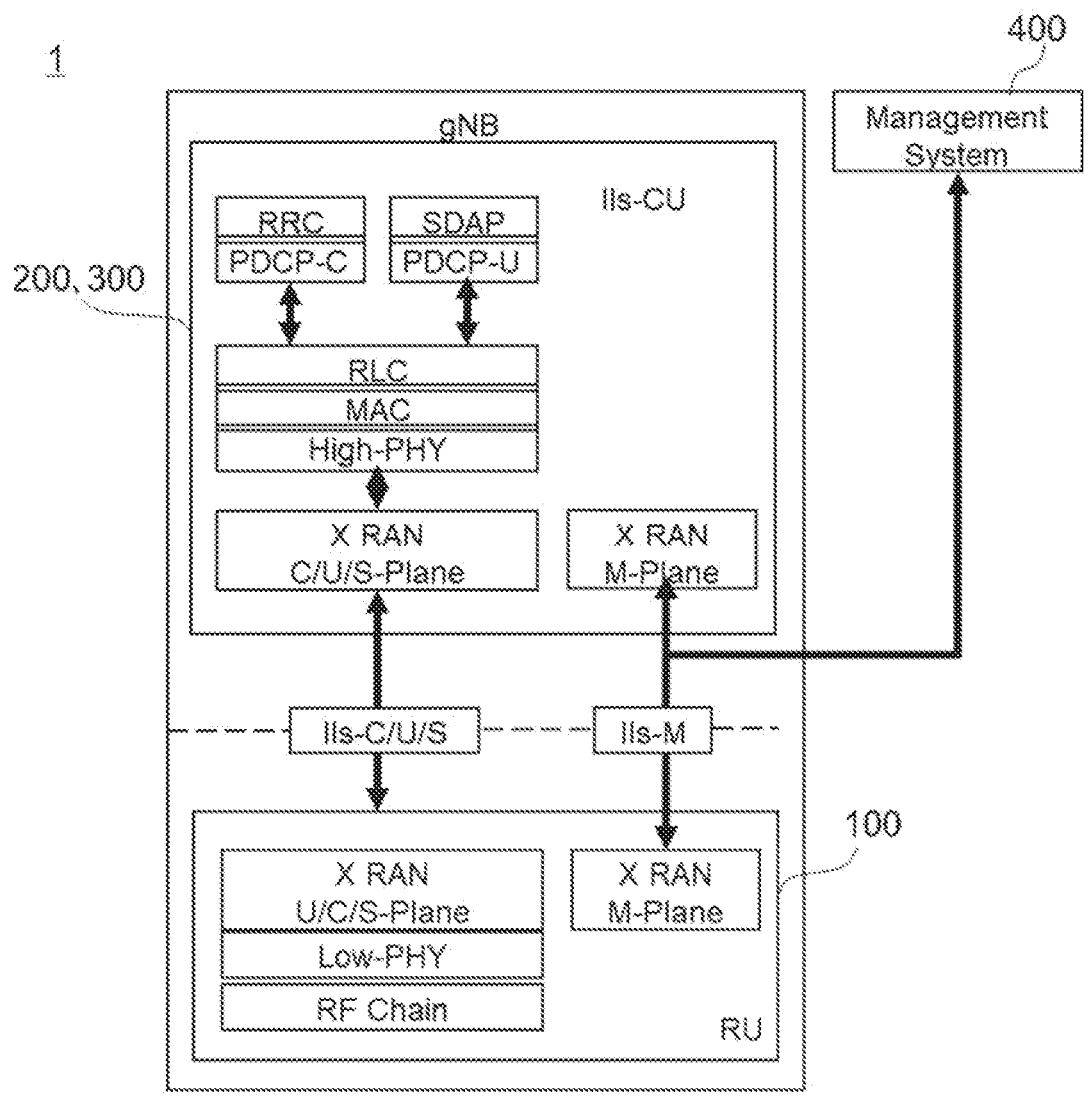
FIG. 7 is a block diagram to show a specific architecture of the system 1 that is implemented when the physical layer is split into a high physical layer and a low physical layer.

As shown in FIG. 7, the server apparatus 100 is a radio unit (RU) that performs the processes of the low physical layer in a base station (for example, a gNB) in the radio access network. To be more specific, the radio unit is a logical node that hosts the low physical layer and radio frequency (RF) processes.

Furthermore, as shown in FIG. 7, the first client (for example, the client apparatus 200) is a lower-layer split-central unit (lls-CU) that performs the processes of higher layers, including the high physical layer, in the base station (gNB) in the radio access network. Here, the lower-layer-split central unit is a logical node to host the packet data convergence protocol (PDCP) layer, the radio link control (RLC) layer, the medium access control (MAC) layer, and the high physical layer.

Furthermore, as shown in FIG. 7, the client apparatus 300 may be a lower-layer split-central unit (lls-CU). Also, the client apparatus 400 may be a network management system to manage the radio access network.

Given the above configuration, for the control plane (C-plane), the user plane (U-plane), and the synchronization plane (S-plane), processes are performed between the server apparatus 100 (RU) and the client apparatuses 200 and 300 (lls-CU).

On the other hand, the management plane (M-plane) is used to support management functions such as the "start-up" installation for RU, software management, configuration management, performance management, failure management, file management, and so forth. To be more specific, the M-plane supports two architectural models. For example, in the hierarchical model, communication takes place between the server apparatus 100 (RU) and the client apparatuses 200 and 300 (lls-CU). Furthermore, in the hybrid model, communication takes place between the server apparatus 100 (RU), and the client apparatuses 200 and 300 (lls-CU) and the client apparatus 400 (network management system).

(2) Information Related to the State of Connection

Figure 8:
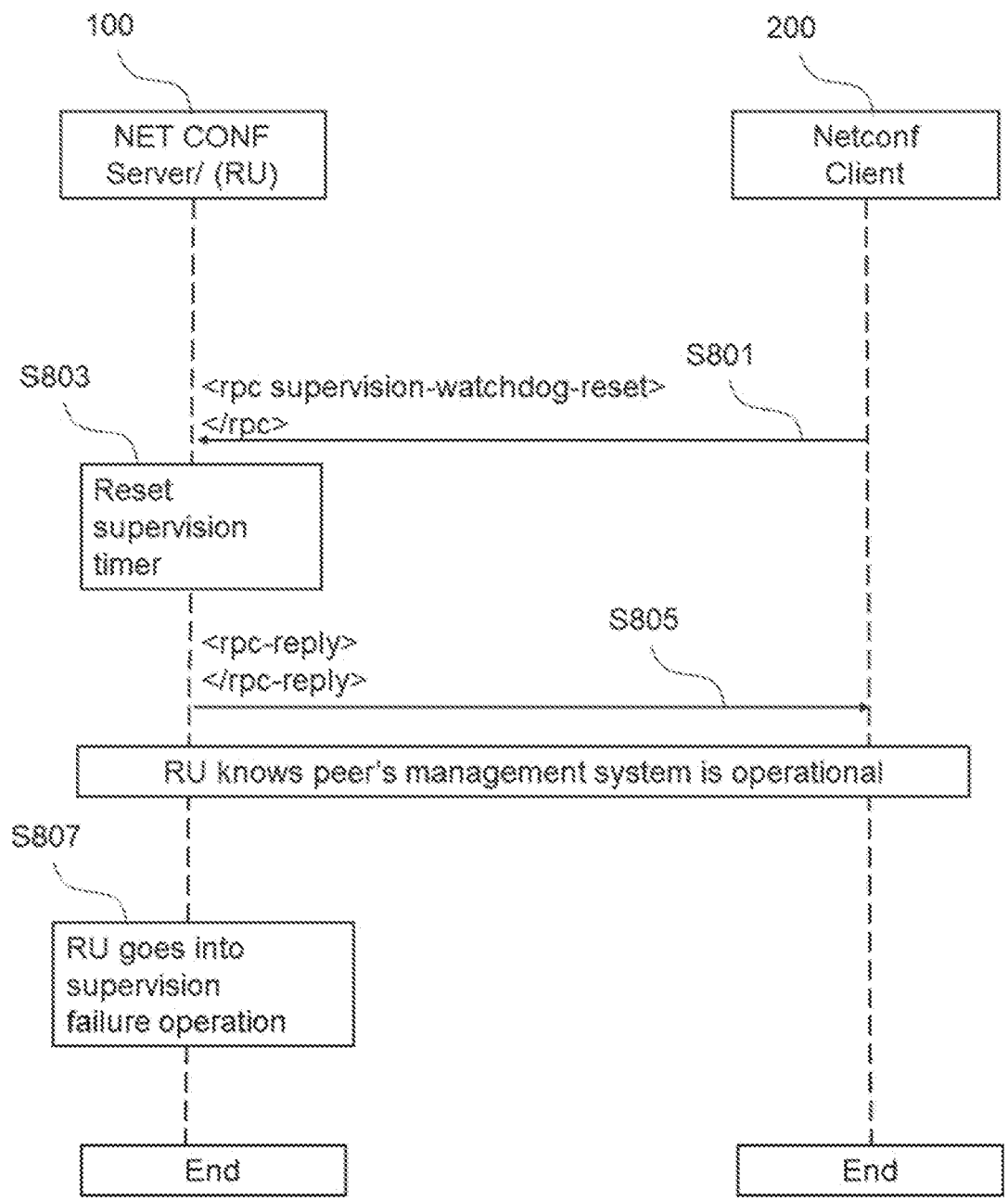
FIG. 8 is a flowchart to show a specific process for detecting the state of connection.

For example, the server apparatus 100 (obtaining unit 145) may detect the connection state of the first client (for example, the client apparatus 200), following the process shown in FIG. 8.

FIG. 8 is a flowchart to show a specific process for detecting the state of connection. For example, the server apparatus 100 periodically receives a message (supervision-watchdog-reset) for resetting a watchdog timer, from the first client (for example, the client apparatus 200) (S801). In response to this message, the server apparatus 100 resets the watchdog timer (S803), and transmits a response message to the first client (for example, the client apparatus 200) (S805). In this way, the server apparatus 100 can recognize that the first client (for example, the client apparatus 200) is operational in the M-plane.

In the process shown in FIG. 8 described above, the server apparatus 100 does not reset the watchdog timer unless the server apparatus 100 receives the supervision-watchdog-reset from the first client (for example, the client apparatus 200). Consequently, when the watchdog timer expires, the server apparatus 100 detects that the connection with the first client (for example, the client apparatus 200) has been disconnected (S807).

In this way, the server apparatus 100 (obtaining unit 145) can detect the above connection state—that is, the state in which the connection with the first client (for example, the client apparatus 200) is disconnected—when the watchdog timer expires.

Information Related to Change of the Connection State

The information related to the connection state with the first client (for example, the client apparatus 200) may include information related to change of the connection state with the first client (for example, the client apparatus 200).

The information related to change of the connection state may include, for example, the information related to the first client (for example, the client apparatus 200) that has changed (for example, the name, IP address, etc.) the type of the standby state ("Unknown", "Active", "Standby", or "Disconnected") of the first client (for example, the client apparatus 200), and information related to the time the connection state changed previously (Last-Changed Time). Furthermore, when the type of the standby state is "Disconnected", the information related to change of the connection state may include the reason the connection state changed (State Change Reason).

(Information Related to the Reason)

To be more specific, the information related to the reason the connection state with the first client changed includes expiration of the watchdog timer in the server apparatus 100, M-plane triggered reset, software failure, expiration of other watchdog timers in the server apparatus 100, and so forth.

(3) M-Plane Architecture Model

Next, the architecture model of the M-plane will be described below with reference to FIG. 9 and FIG. 10.

Hierarchical Model

Figure 9:
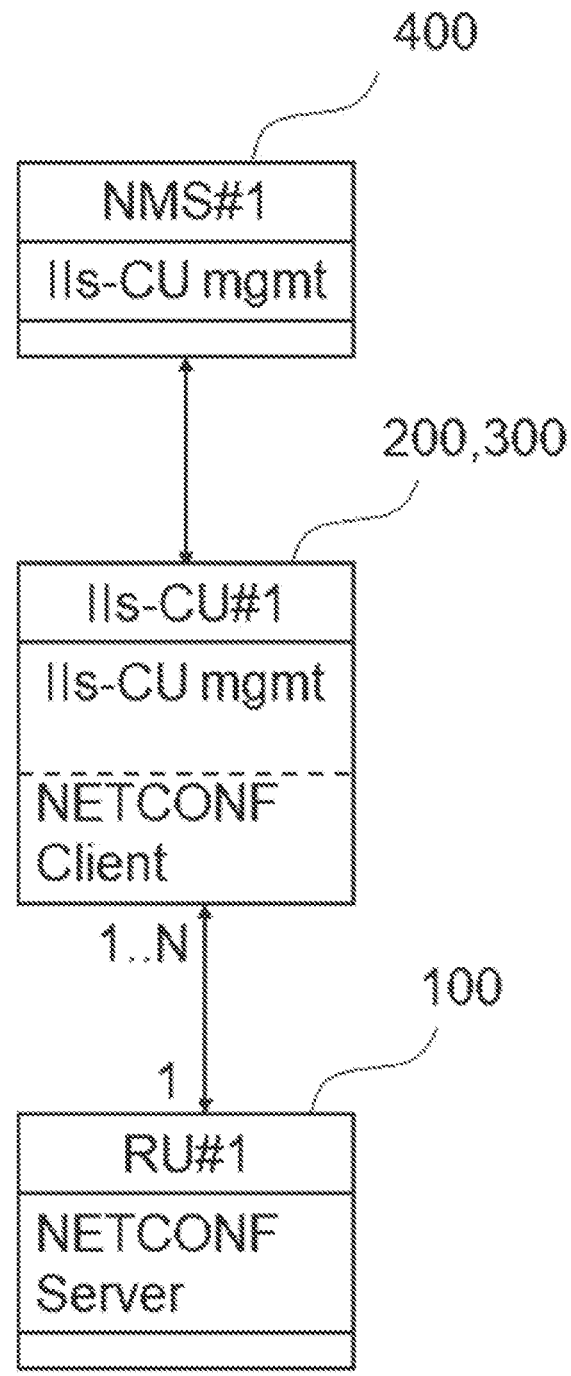
FIG. 9 is a diagram to show a schematic configuration of a hierarchical model that M-plane supports.

FIG. 9 is a diagram to show a schematic configuration of a hierarchical model that M-plane supports. As shown in FIG. 9, the server apparatus 100 (RU #1) is managed by the client apparatuses 200 and 300 (lls-CU #1), using a NETCONF-based M-plane. Furthermore, the client apparatuses 200 and 300 (lls-CU #1) are managed by the client apparatus 400 (for example, network management system NMS #1).

When the M-plane is a hierarchical model as described above, the second client (for example, the client apparatus 300) may be a lls-CU that performs the processes of the second layer.

Furthermore, the server apparatus 100 (establishing unit 143) establishes an active-state connection with the first client (for example, the client apparatus 200). Here, to be more specific, the active state refers to the state in which services can be provided.

On the other hand, for example, the server apparatus 100 (establishing unit 143) establishes a standby-state connection with the second client (for example, the client apparatus 300). Here, the standby state refers to the state of waiting before making a transition to the state (active state) in which services can be provided.

As a specific example, when each of the first and second clients can take four types of states, namely "hot standby", "cold standby", "providing service", and "unknown", "hot standby" and "cold standby" may be treated as the above standby state. Also, "providing service" may be treated as the above active state. The state ("Disconnect") in which connection is disconnected may also be included as one of the states that the first and second clients each can take.

When the above hierarchical model is employed, the server apparatus 100 (communication processing unit 147) transmits the information related to the connection state with the first client (for example, the client apparatus 200), to the second client (for example, the client apparatus 300). By this means, it is possible to request the second client (for example, the client apparatus 300) to switch from the standby state to the active state.

On the other hand, the second client (for example, the communication processing unit 331 of the client apparatus 300) receives the information related to the connection state with the first client (for example, the client apparatus 200). Then, the second client (for example, the control unit 333 of the client apparatus 300) can change the connection state, established with the server apparatus 100, from the standby state to the active state.

Note that the second client (for example, the control unit 333 of the client apparatus 300) determines whether the C-plane, U-plane and S-plane connections of the first client (for example, the client apparatus 200) are normal. If the connections are normal, the second client may allow the first client (for example, the client apparatus 200) to continue performing the processes of the C/U/S-planes, without reconfiguring the C/U/S-planes. By this means, the M-plane connection, where a failure has occurred, may be reconfigured. On the other hand, if the C/U/S-plane connections are also abnormal, the second client may reconfigure the C/U/S-planes with the new M-plane connection.

Furthermore, after transmitting the information related to the connection state with the first client, the server apparatus 100 (communication processing unit 147) may receive information, from the second client (for example, the client apparatus 300), indicating that the connection between the server apparatus 100 and the second client (for example, the client apparatus 300) has changed from the standby state to the active state.

Furthermore, the information to indicate that the standby state has changed to the active state may include information that specifies which M-plane interface is to be placed in the active state, information that specifies which M-plane interface is to be placed in the standby state, or information that specifies both of these.

By this means, subsequent processes such as, for example, refreshing the U-plane configuration can be executed properly between the server apparatus 100 and the second client (for example, the client apparatus 300).

(2) Process Flow

Now, with reference to FIG. 10, an example of the process for changing the connecting object of the server apparatus 100 when the hierarchical model is employed will be described below. FIG. 10 is a flowchart to illustrate an example of a schematic flow of the process for changing the connection state of the client apparatus with which the server apparatus 100 is connected.

In step S1001, the server apparatus 100 (establishing unit 143) establishes an active-state connection with the first client (for example, the client apparatus 200). To be more specific, the server apparatus 100 establishes a NETCONF connection with the first client (for example, the client apparatus 200), and supervises the connection state of the first client (for example, the client apparatus 200).

In S1003, the server apparatus 100 (establishing unit 143) establishes a standby-state connection with the second client (for example, the client apparatus 300). To be more specific, the server apparatus 100 establishes a NETCONF connection with the second client (for example, the client apparatus 300), and supervises the connection state of the second client (for example, the client apparatus 300).

In step S1005, the server apparatus 100 executes an additional process related to M-plane handlings, including U-plane configuration, with the first client (for example, the client apparatus 200). By this means, user data and/or the like are transmitted and received between the server apparatus 100 and the first client (for example, the client apparatus 200).

In step S1007, a failure event might occur, in which the connection between the server apparatus 100 and the first client (for example, the client apparatus 200) is disconnected. Here, assume that the connection between the server apparatus 100 and the second client (for example, the client apparatus 300) is not disconnected.

In step S1009, when the connection with the first client (for example, the client apparatus 200) is disconnected, the server apparatus 100 detects a supervision failure.

In step S1011, the server apparatus 100 transmits information (State Change Event Notification) related to the connection state between the server apparatus 100 and some or all of the clients, to the second client (for example, the client apparatus 300), instead of performing the reset procedure for autonomously rebuilding the connection with the first client (for example, the client apparatus 200). Here, the information related to the connection state (State Change Event Notification) may include information to indicate that the connection with the first client has shown a supervision failure.

In step S1013, the second client (the control unit 333 of the client apparatus 300) controls the connection between the server apparatus 100 and the second client (client apparatus 300), depending on the information related to the connection state between the server apparatus 100 and the client. That is, the second client (the control unit 333 of the client apparatus 300) switches the connection between the server apparatus 100 and the second client (client apparatus 300) from the standby state to the active state.

Note that the second client (the communication processing unit 331 of the client apparatus 300) may transmit a message to command the server apparatus 100 to change from the standby state to the active state. Here, the information to command change from the standby state to the active state may include information that specifies which M-plane interface is to be placed in the active state, information that specifies which M-plane interface is to be placed in the standby state, or information that specifies both of these.

In step S1015, the server apparatus 100 executes an additional process related to M-plane handlings, including U-plane configuration, with the second client (for example, the client apparatus 300). By this means, user data is transmitted and received between the server apparatus 100 and the second client (for example, the client apparatus 300).

Figure 10:
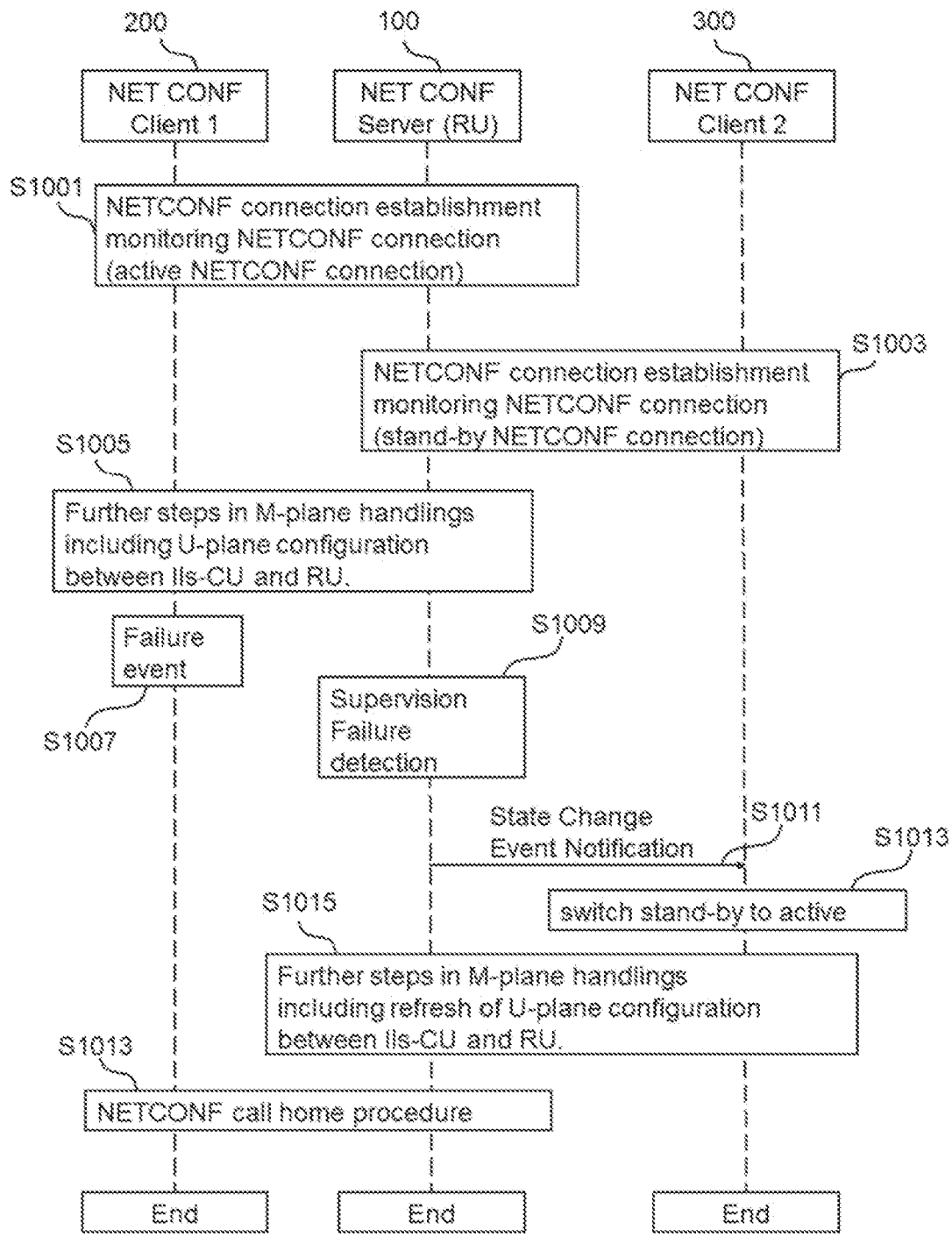
FIG. 10 is a flowchart to illustrate an example of a schematic flow of the process for changing the connection state of the client apparatus with which the server apparatus 100 is connected.

In step S1017, the server apparatus 100 executes NETCONF call home procedures with the first client (for example, the client apparatus 200), reestablishes a transmission control protocol (TCP) connection with the first client (for example, the client apparatus 200), and finishes the process shown in FIG. 10.

According to the process shown in FIG. 10 above, the server apparatus 100 can start establishing an M-plane connection with the second client (client apparatus 300) by notifying the second client (client apparatus 300) that the connection with the first client (for example, the client apparatus 200) has been disconnected. That is, according to the process shown in FIG. 10 above, two or more clients (the first client and the second client) can make the process of the second layer redundant, and the server apparatus 100 can properly switch the client with which user data is transmitted and received.

Hybrid Model

Figure 11:
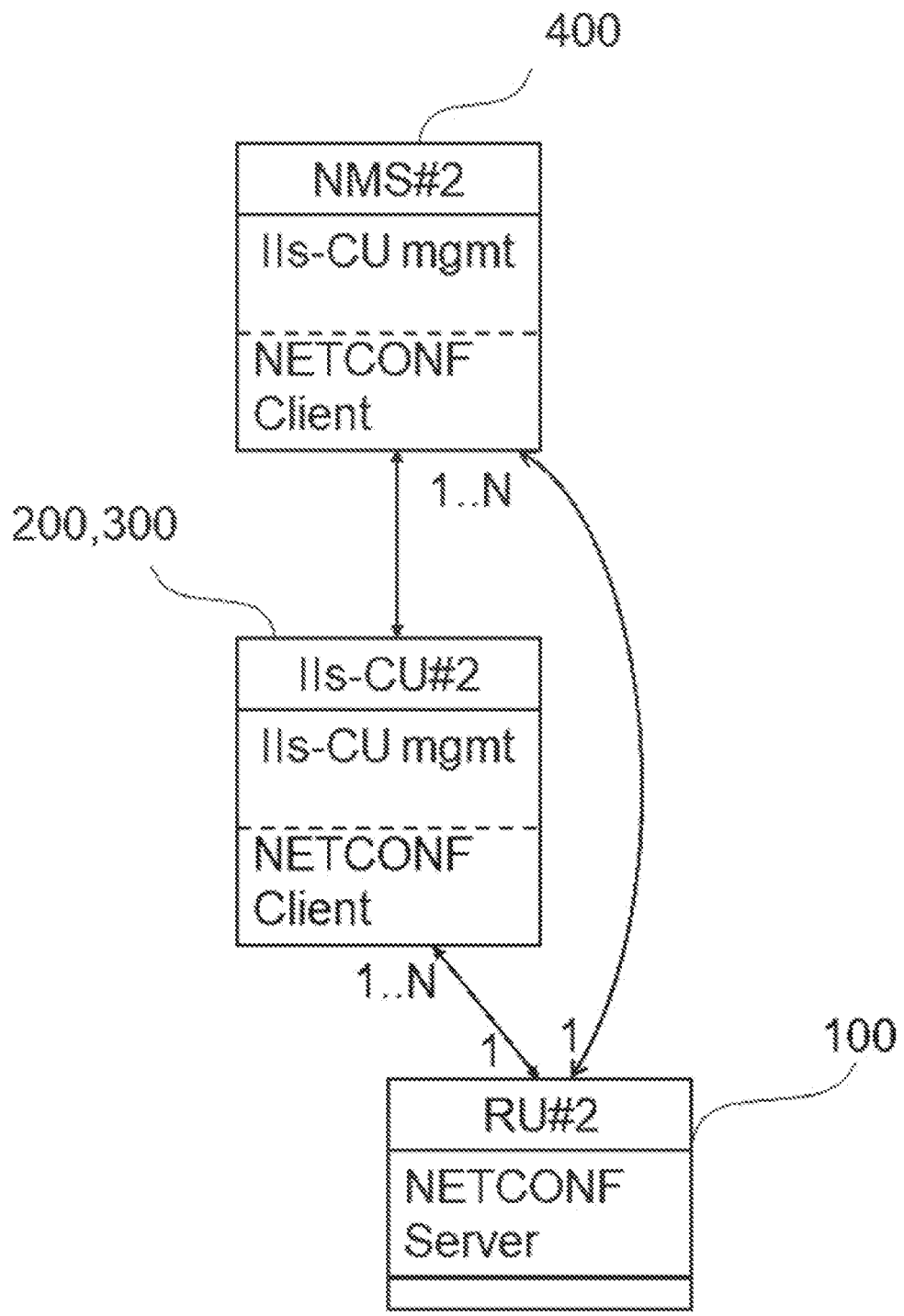
FIG. 11 is a diagram to show a schematic configuration of a hybrid model that M-plane supports.

FIG. 11 is a diagram to show a schematic configuration of a hybrid model that M-plane supports. As shown in FIG. 11, the hybrid architecture implements an interface between the client apparatus 400 (for example, network management system NMS #2) and the server apparatus 100 (RU #2), in addition to the interface between the client apparatuses 200 and 300 (lls-CU #2) and the server apparatus 100 (RU #2). That is, in the hybrid architecture, NETCONF clients of different classes (for example, lls-CU #2 and network management system NMS #2) may be connected with the server apparatus 100 (RU #2).

If the M-plane is a hybrid model as described above, the second client (for example, the client apparatus 400) may be a network management system to manage the radio access network.

When the above hierarchical model is employed, the server apparatus 100 (communication processing unit 147) transmits the information related to the connection state with the first client, to the second client (for example, the client apparatus 400). By this means, the second client (for example, the control unit 433 of the client apparatus 400) can control a third client (for example, the client apparatus 300), which is a different lls-CU from the first client, to switch from the standby state to the active state.

In this way, the connection state of the third client (for example, the client apparatus 300) is switched, mediated by the second client (for example, the client apparatus 400). In this way, processes such as selecting or determining which M-plane connection is the main connection are performed by the second client (for example, the client apparatus 400), so that the load between clients can be distributed.

Furthermore, after transmitting the information related to the connection state with the first client, the server apparatus 100 (communication processing unit 147) may receive information, from the second client (for example, the client apparatus 400), that commands changing the connection between the server apparatus 100 and the third client (for example, the client apparatus 200) from the standby state to the active state.

Furthermore, the information to command change from the standby state to the active state may include information that specifies which M-plane interface is to be placed in the active state, information that specifies which M-plane interface is to be placed in the standby state, or information that specifies both of these.

By this means, subsequent processes such as, for example, refreshing the U-plane configuration can be executed quickly, between the server apparatus 100 and the third client (for example, the client apparatus 300).

3.6. Example Alternation

The first example embodiment is not limited to the configurations and processes described above, and a variety of changes are possible.

For example, when the server apparatus 100 detects disconnection with the first client, for example, instead of notifying (transmitting) the information related to the connection state of the first client, to the second client, the server apparatus 100 may perform the following processes.

That is, when the server apparatus 100 detects disconnection with the first client, the server apparatus 100 may perform a predetermined reset process and perform the process for establishing an active-state connection with the second client. By this means, the server apparatus 100 can establish an active-state connection with the second client (client apparatus 300), after a failure occurs in communication with the first client.

4. Second Example Embodiment

Figure 12:
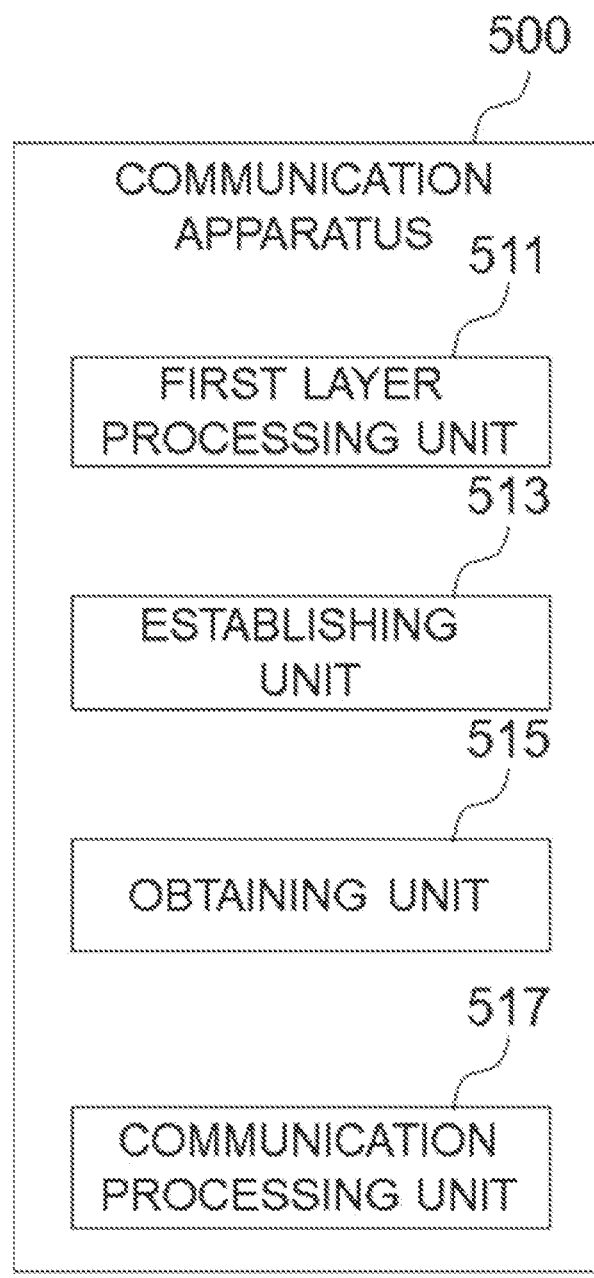
FIG. 12 is a block diagram to show an example of a schematic configuration of a communication apparatus 500 according to a second example embodiment.

Next, a second example embodiment of the present invention will be described below with reference to FIG. 12. Although the first example embodiment described above has been a specific example embodiment, the second example embodiment will be a more generalized example embodiment.

4.1. Configuration of Communication Apparatus

First, an example of the configuration of a communication apparatus 500 according to the second example embodiment will be described below with reference to FIG. 12. FIG. 12 is a block diagram to show an example of a schematic configuration of the communication apparatus 500 according to the second example embodiment. Referring to FIG. 12, the communication apparatus 500 includes a first layer processing unit 511, an establishing unit 513, an obtaining unit 515, and a communication processing unit 517. The specific operations of the first layer processing unit 511, the establishing unit 513, the obtaining unit 515, and the communication processing unit 517 will be described in detail later.

The first layer processing unit 511, the establishing unit 513, the obtaining unit 515, and the communication processing unit 517 may be implemented by the same processor, or may be implemented separately by different processors. The first layer processing unit 511, the establishing unit 513, the obtaining unit 515, and the communication processing unit 517 may include a memory that stores a program (commands) and one or more processors that can execute this program (commands), and these one or more processors may perform the operations of the first layer processing unit 511, the establishing unit 513, the obtaining unit 515, and the communication processing unit 517. The above program may be a program that causes the processors to execute the operations of the first layer processing unit 511, the establishing unit 513, the obtaining unit 515, and the communication processing unit 517.

4.2. Technical Features

Next, technical features of the second example embodiment will be described.

With the second example embodiment, the communication apparatus 500 (first layer processing unit 511) performs the processes of the first layer in the radio access network. The communication apparatus 500 (establishing unit 513) performs the process for establishing connections with two or more clients that perform the processes of the second layer, which is higher than the first layer, in the radio access network. The communication apparatus 500 (obtaining unit 515) acquires information related to the connection state with the first client that performs the processes of the second layer. The communication apparatus 500 (communication processing unit 517) transmits the information related to the connection state with the first client, to the second client.

For example, the first layer processing unit 511 may perform the operation of the first layer processing unit 141 according to the first example embodiment described above. Also, the establishing unit 513 may perform the operation of the establishing unit 143 according to the first example embodiment described above. Also, the obtaining unit 515 may perform the operation of the obtaining unit 145 according to the first example embodiment described above. Furthermore, the communication processing unit 517 may perform the operation of the communication processing unit 147 according to the first example embodiment described above.

The second example embodiment has been described above. According to the second example embodiment, for example, in an architecture in which the inside of a radio access network is split into two layers and the processes are performed in separate apparatuses, respectively, the redundancy of the processes of the second layer, which is higher than the first layer, can be achieved.

5. Third Example Embodiment

Next, a third example embodiment of the present invention will be described below. Although the first example embodiment described above has been a specific example embodiment, the third example embodiment will be a more generalized example embodiment.

5.1. Configuration of Communication Apparatus

Figure 13:
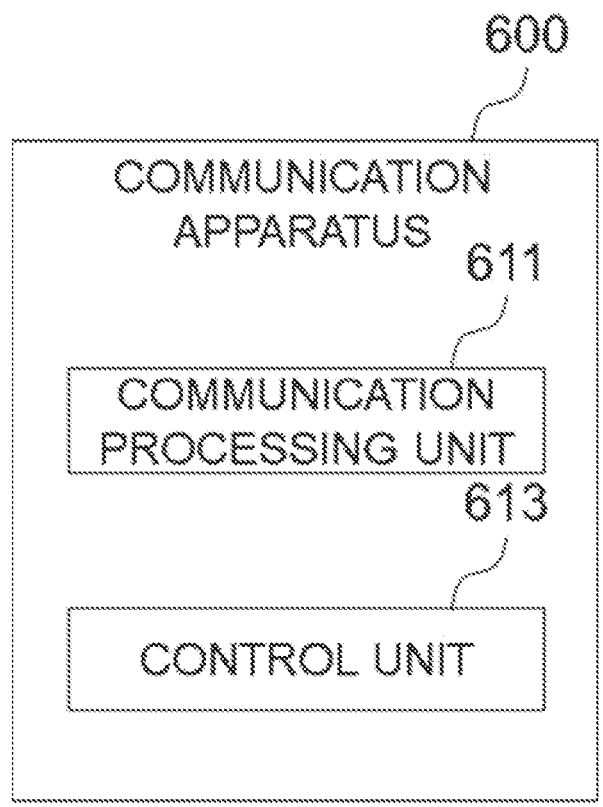
FIG. 13 is a block diagram to show an example of a schematic configuration of a communication apparatus 600 according to a third example embodiment.

Next, an example of the configuration of a terminal apparatus 600 according to the third example embodiment will be described below with reference to FIG. 13. FIG. 13 is a block diagram to show an example of a schematic configuration of the communication apparatus 600 according to the third example embodiment. Referring to FIG. 13, the communication apparatus 600 includes a communication processing unit 611 and a control unit 613. Specific operations of the communication processing unit 611 and the control unit 613 will be described in detail later.

The communication processing unit 611 and the control unit 613 may be implemented by the same processor, or may be implemented separately by different processors. The communication processing unit 611 and the control unit 613 may include a memory that stores a program (commands) and one or more processors that can execute this program (commands), and these one or more processors may perform the operations of the communication processing unit 611 and the control unit 613. The program may be a program that causes the processors to execute the operations of the communication processing unit 611 and the control unit 613.

5.2. Technical Features

Next, technical features of the third example embodiment will be described below.

According to the third example embodiment, the communication apparatus 600 (communication processing unit 611) communicates with a server that performs the processes of the first layer in a radio access network, the server being connectable with two or more client apparatuses that perform the processes of a second layer, which is higher than the first layer, in the radio access network, and receives information related to the connection state between the server and the first client performing the processes of the second layer. The communication apparatus 600 (control section 613) performs control related to the connection between the server and a second client that performs the processes of the second layer, depending on the information related to the connection state with the first client.

Also, the communication apparatus 600 may be an apparatus to implement the second client, or may be an apparatus to manage the radio access network. For example, the communication processing unit 611 may perform the operations of the communication processing units 231, 331, and 431 according to the first example embodiment described above. Also, the control unit 613 may perform the operations of the control units 233, 333 and 433 according to the first example embodiment described above.

The third example embodiment has been described above. According to the third example embodiment, for example, in an architecture in which the inside of a radio access network is split into two layers and the processes are performed in separate apparatuses, respectively, the redundancy of the processes of the second layer, which is higher than the first layer, can be achieved.

6. Other Example Embodiments

Although example embodiments of the present invention have been described above, the present invention is by no means limited to these example embodiments. It will be understood by those of ordinary skill in the art that these example embodiments are simply examples, and that a variety of changes can be made without departing from the scope and spirit of the present invention.

For example, the steps in the processes described in the Specification do not necessarily have to be executed in chronological order according to the order described in the sequence diagram. For example, the steps in the processes may be executed in an order different from the order illustrated in the sequence diagram, or may be executed in parallel. Also, some of the steps in the processes may be deleted, or additional steps may be added to the processes.

Also, an apparatus to have components (for example, the first layer processing unit, the establishing unit, the obtaining unit, and/or the communication processing unit) of the server apparatus described in the Specification (for example, one or more apparatuses (or units) among a number of apparatuses (or units) that constitute the server apparatus, or a module for one of these apparatuses (or units)) may be provided. An apparatus (for example, a module for a client apparatus) to have components of the client apparatuses described in the Specification (for example, the communication processing unit and/or the control unit)) may be provided. Furthermore, a method to include processes by these components may be provided, and a program to cause processors to execute the processes of these components may be provided. Also, a non-transitory computer-readable recording medium that records this program may be provided. Obviously, such apparatus, module, method, program, and non-transitory computer-readable recording medium are included in the present invention.

Some of or all of the example embodiments can be described as in the following supplementary notes, but are not limited to the following.

Supplementary Note 1

A communication apparatus comprising:
a first layer processing unit configured to perform a process of a first layer in a radio access network;
an establishing unit configured to perform a process for establishing connections with two or more clients performing a process of a second layer, which is higher than the first layer in the radio access network;
an obtaining unit configured to obtain information related to a connection state with a first client performing the process of the second layer; and
a communication processing unit configured to transmit, to a second client, the information related to the connection state with the first client.

Supplementary Note 2

The communication apparatus according to supplementary note 1, wherein the communication apparatus is a radio unit of the radio access network.

Supplementary Note 3

The communication apparatus according to supplementary note 1 or 2, wherein the first client is a lower-layer split central unit in the radio access network.

Supplementary Note 4

The communication apparatus according to any one of supplementary notes 1 to 3, wherein the information related to the connection state with the first client includes information related to change in the connection state with the first client.

Supplementary Note 5

The communication apparatus according to any one of supplementary notes 1 to 4, wherein the information related to change in the connection state with the first client includes information related to a reason for change in the connection state with the first client.

Supplementary Note 6

The communication apparatus according to any one of supplementary notes 1 to 5, wherein the establishing unit is configured to establish a connection in an active state with the first client.

Supplementary Note 7

The communication apparatus according to any one of supplementary notes 1 to 6, wherein the second client performs the process of the second layer.

Supplementary Note 8

The communication apparatus according to supplementary note 7, wherein the establishing unit is configured to establish a connection in a standby state with the second client.

Supplementary Note 9

The communication apparatus according to supplementary note 7 or 8, wherein the communication processing unit is configured to receive, from the second client, information indicating that the connection between the communication apparatus and the second client has changed from a standby state to the active state, after transmitting the information related to the connection state with the first client.

Supplementary Note 10

The communication apparatus according to any one of supplementary notes 7 to 9, wherein the second client is a lower-layer split-central unit in the radio access network.

Supplementary Note 11

The communication apparatus according to any one of supplementary notes 1 to 6, wherein the second client performs management related to the radio access network.

Supplementary Note 12

The communication apparatus according to supplementary note 11, wherein the communication processing unit is configured to receive, from the second client, information for commanding to change a connection between the communication apparatus and a third client performing the process of the second layer, from a standby state to an active state, after transmitting the information related to the connection state with the first client.

Supplementary Note 13

A communication apparatus comprising:
a communication processing unit configured to communicate with a server performing a process of a first layer in a radio access network, the server being connectable with two or more client apparatuses performing a process of a second layer, which is higher than the first layer, in the radio access network, and receive information related to connection state between the server and a first client performing the process of the second layer; and
a control unit configured to perform control related to a connection between the server and a second client performing the process of the second layer, depending on the information related to the connection state with the first client.

Supplementary Note 14

The communication apparatus according to supplementary note 13, wherein the communication apparatus is an apparatus for implementing the second client.

Supplementary Note 15

The communication apparatus according to supplementary note 13, wherein the communication apparatus performs management related to the radio access network.

Supplementary Note 16

A method comprising:
performing a process of a first layer in a radio access network;
performing a process for establishing connections with two or more clients performing a process of a second layer, which is higher than the first layer, in the radio access network;

obtaining information related to a connection state with a first client performing the process of the second layer; and transmitting, to a second client, the information related to the connection state with the first client.

Supplementary Note 17

A method comprising:
communicating with a server performing a process of a first layer in a radio access network, the server being connectable with two or more client apparatuses performing a process of a second layer, which is higher than the first layer, in the radio access network, and receiving information related to a connection state between the server and a first client performing the process of the second layer; and performing control related to a connection between the server and a second client performing the process of the second layer, depending on the information related to the connection state with the first client.

Supplementary Note 18

A program that causes a processor to execute:
performing a process of a first layer in a radio access network;
performing a process for establishing connections with two or more clients performing a process of a second layer, which is higher than the first layer, in the radio access network;
obtaining information related to a connection state with a first client performing the process of the second layer; and
transmitting, to a second client, the information related to the connection state with the first client.

Supplementary Note 19

A program that causes a processor to execute:
communicating with a server performing a process of a first layer in a radio access network, the server being connectable with two or more client apparatuses performing a process of a second layer, which is higher than the first layer, in the radio access network, and receiving information related to a connection state between the server and a first client performing the process of the second layer; and
performing control related to a connection between the server and a second client performing the process of the second layer, depending on the information related to the connection state with the first client.

Supplementary Note 20

A non-transitory computer-readable recording medium storing a program that causes a processor to execute:
performing a process of a first layer in a radio access network;
performing a process for establishing connections with two or more clients performing a process of a second layer, which is higher than the first layer in the radio access network;
obtaining information related to a connection state with a first client performing the process of the second layer; and
transmitting, to a second client, the information related to the connection state with the first client.

Supplementary Note 21

A non-transitory computer readable recording medium storing a program that causes a processor to execute:
performing communication with a server performing a process of a first layer in a radio access network, the server being connectable with two or more client apparatuses performing a process of a second layer, which is higher than the first layer, in the radio access network, and receiving information related to a connection state between the server and a first client performing the process of the second layer; and
performing control related to a connection between the server and a second client performing the process of the second layer, depending on the information related to the connection state with the first client.

This application claims the priority on the basis of Japanese Patent Application No. 2018-159929, filed on Aug. 29, 2018, and the disclosure including the specification, drawings and abstract, is incorporated herein by reference in its entirety.

INDUSTRIAL APPLICABILITY

In an architecture in which the inside of a radio access network is split into two layers and the processes are performed in separate apparatuses, respectively, the redundancy of the processes of the second layer, which is higher than the first layer, can be achieved.

REFERENCE SIGNS LIST

1 System
2 Terminal apparatus
100 Server apparatus
141 First layer processing unit
143 Establishing unit
145 Obtaining unit
147, 231, 331 and 431 Communication processing unit
200, 300 and 400 Client apparatus
233, 333 and 433 Control unit

What is claimed is:
1. A radio unit hosting a first physical layer, the radio unit comprising:
a memory storing instructions; and
a processor configured to execute the instructions to:
connect with a plurality of clients, each having a function of a second physical layer higher than the first physical layer, the function comprising a scrambling function, a modulation function, and a demodulation function;
monitor connectivity to a first client with the function, based on a timer; and
send, based on an expiration of the timer, information to a second client, the information indicating a loss of supervision with respect to the first client,
wherein the timer is reset based on a signal received from the first client, and
wherein the radio unit has a fast Fourier transform (FFT) function and an inverse fast Fourier transform (iFFT) function.
2. The radio unit of claim 1,
wherein the connecting comprises M-Plane (Management-Plane) connection.

3. The radio unit of claim 1, wherein the processor is further configured to executed the instruction to:
send, to the second client, information indicating a cause of the loss of supervision based on the expiration of the timer.

4. The radio unit of claim 1,
wherein the signal comprises supervision-watchdog-reset data.

5. A method of a radio unit hosting a first physical layer, the method comprising:
connecting with a plurality of clients, each having a function of a second physical layer higher than the first physical layer, the function comprising a scrambling function, a modulation function, and a demodulation function;
monitoring connectivity to a first client with the function, based on a timer; and
sending, based on an expiration of the timer, information to a second client, the information indicating a loss of supervision with respect to the first client,
wherein the timer is reset based on a signal received from the first client, and
wherein the radio unit has a fast Fourier transform (FFT) function and an inverse fast Fourier transform (iFFT) function.

6. The method of claim 5,
wherein the connecting comprises M-Plane (Management-Plane) connection.

7. The method of claim 5, further comprising:
sending, to the second client, information indicating a cause of the loss of supervision based on the expiration of the timer.

8. The method of claim 5,
wherein the signal comprises supervision-watchdog-reset data.

* * * * *